United States Patent [19]

Kurtz

[11] 3,901,850

[45] Aug. 26, 1975

[54] VINYL CHLORIDE POLYMERS CONTAINING ZINC TUNGSTATE

[75] Inventor: Donald M. Kurtz, Akron, Ohio

[73] Assignee: The B. F. Goodrich Company, Akron, Ohio

[22] Filed: Aug. 1, 1974

[21] Appl. No.: 493,722

[52] U.S. Cl. ............... 260/45.75 W; 260/42.49
[51] Int. Cl. ............................................ C08f 45/56
[58] Field of Search ......... 260/45.75 W; 106/15 FP; 117/138

[56] References Cited
UNITED STATES PATENTS

| | | | |
|---|---|---|---|
| 1,612,104 | 12/1926 | Eichengrun | 117/138 |
| 1,852,998 | 4/1932 | Ellis | 117/137 |
| 2,610,920 | 9/1952 | Hopkinson | 260/45.75 |
| 3,560,441 | 2/1971 | Schwarcz et al. | 260/45.75 |

OTHER PUBLICATIONS

The Chemistry and Uses of Fire Retardants by Lyons, Wiley Interscience, pp. 112 & 158, 1972.
Hameproofing Textile Fabrics by Little pp. 217 to 222, Reinhold Pub. Co., 1947.

*Primary Examiner*—V. P. Hoke
*Attorney, Agent, or Firm*—J. Hughes Powell, Jr.

[57] ABSTRACT

Vinyl chloride polymers are compounded with zinc tungstate to provide improved flame resistance and reduce smoke production.

4 Claims, No Drawings

VINYL CHLORIDE POLYMERS CONTAINING ZINC TUNGSTATE

BACKGROUND OF THE INVENTION

Presently there is a pressing need for improved plastic products which are safer in fire situations, even for vinyl chloride polymers which generally are considered to be flame resistant. While rigid vinyl chloride products have many structural applications useful in buildings and transportation vehicles, many uses are also made of plasticized vinyl chloride polymers as in fabrics, upholstery, wall coverings and the like where flame resistance and smoke formation could be a problem. Government and safety regulations relating to such materials are now in effect. Not only is flame resistance to be reduced in such materials as vinyl chloride plastic products, but smoke generated by vinyl chloride polymer products in fires also must be reduced. The NBS smoke chamber is accepted as a measure of smoke generated. Charring is also desired to decrease flame spread. While a number of materials have been proposed and used in vinyl chloride for this purpose, very few have been found to be completely satisfactory. Many are not compatible or readily mixed with vinyl chloride polymers, many are colored or form colored products in vinyl chloride polymer compositions and many have adverse effects on the physical properties of vinyl chloride polymers.

SUMMARY OF THE INVENTION

Zinc tungstate is a very effective fire and smoke retardant in vinyl chloride polymer compositions even in low concentrations. The zinc compound is compatible and easily mixed with vinyl chloride polymers in both rigid and flexible forms, has low tinting power, does not form objectionable color products in vinyl chloride polymers and has no adverse effects on the physical properties or processing of compounds containing it.

DETAILED DESCRIPTION

The zinc tungstate is normally used in powder form in amounts greater than about 0.01 part per 100 weight parts of vinyl chloride polymer, more preferably from about 0.1 to about 5 to 10 weight parts per 100 weight parts of vinyl chloride polymer. From about 0.25 to about 3 weight parts is a very practical range providing a good balance of desirable properties in the compounds. The zinc tungstate is readily mixed with the vinyl chloride polymers in powder form as is any other powder ingredient mixed with vinyl chloride polymers as is well known to those skilled in the art.

The vinyl chloride polymers include those vinyl chloride polymers that are homopolymers, that is, polyvinyl chloride, as well as those copolymers containing vinyl chloride and up to about 50%, more usually about 30% by weight of at least one other vinylidene monomer containing at least one terminal $CH_2=C<$ group such as vinylidene chloride, alkyl acrylates and methacrylates wherein the alkyl group contains 1 to 10 carbon atoms, acrylic acids, amides and nitriles thereof such as acrylic acid, ethacrylic acid, acrylamides, N-methylol methacrylamide, acrylonitrile, methacrylonitrile and the like, alpha-olefins containing 2 to 6 carbon atoms such as ethylene and propylene, vinyl esters such as vinyl acetate, vinyl butyrate, vinyl benzoate, vinyl aromatics such as styrene, chlorostyrene, ethyl styrene, vinyl naphthalene, vinyl alkyl ethers, vinyl ketones, chlorinated vinyl chloride polymers; and blends of vinyl chloride polymers with other polymers, both plastics and elastomers, for example, with ABS resins, with 10 to 40% of copolymers of styrene and acrylonitrile or styrene and methyl methacrylate wherein styrene is the major component, elastomers containing about equal amounts of styrene and acrylonitrile with butadiene, polyurethanes, nitrile elastomers, both liquid and solid containing from about 15 to 40% acrylonitrile with the remainder butadiene, polyolefins and the like. These vinyl chloride polymers normally are high molecular weight polymers having a specific viscosity greater than 0.4 measured as a 0.4% solution in nitrobenzene.

The vinyl chloride polymers will be mixed with standard compounding ingredients known to those skilled in the art, pigments, plasticizers, lubricants, stabilizers, fillers, colorants, processing aids, other flame and smoke retardants, and the like. While these compounds are most effective in vinyl chloride polymers substantially free of plasticizers subject to burning, they also provide improved compositions as to flame propagation and smoke when plasticizers are present.

In the following Examples, there is reported the oxygen index, OI, a $D'_{0.6}$ smoke rating and $D_m$, a maximum optical density observed with a vertical light path in the National Bureau of Smoke Chamber (NBS). The oxygen index is determined in accordance with ASTM D2863 test method and $D'_{0.6}$ smoke number measured when this apparatus is modified by the means described by Dipietro et al., Journal of Flame and Flammability, Volume 2, Page 36, 1971, i.e., the optical density of the smoke generated when the sample is burning at the rate of 0.6 gram/minute. The NBS smoke chamber and its use are described by Gross et al in fire test methods ASTM STP 422, 1967, Pages 166–206. The NBS $D_m$ smoke numbers reported are in the flaming mode.

EXAMPLE I

A vinyl chloride polymer compound was prepared by mixing 100 weight parts of polyvinyl chloride, Geon 110X233, specific viscosity 0.38 – 0.42% in nitrobenzene at 30°C., with 2 weight parts of polyethylene having a specific gravity of 0.924 g/cc and melt index of 5 g/10 minutes, and the amounts of zinc compounds shown in the data table below. The ingredients were all dry blended, milled at 330°F. for 5 minutes, press molded at 350°F. for 8 minutes at 320°F. 6 × 0.25 × 0.075 inch test samples were used for the Oxygen Index and Smoke-OI. 2-7/8 × 2-7/8 × 0.05 inch test samples were used for the NBS smoke chamber and the % char formed was on ¼ × ¾ × 0.075 inch or dry pressed ¼ × ¾ × 0.280 inch pellets. A 1 minute burn was used.

TABLE I

| Zinc Salt (phr) | | % Zn in Recipe | Oxygen Index | $D'_{0.6}$[a] | $D_m$[b] | % Char[c] | % TC[d] |
|---|---|---|---|---|---|---|---|
| None | | — | 42 | 550 | 630 | 2 | 5 |
| $Zn_2P_2O_7$ | (½) | .22 | 38 | 755 | — | 2.7 | 6 |
| | (2) | .84 | 43 | 685 | — | 5.2 | 12 |

TABLE I — continued

| Zinc Salt (phr) | | % Zn in Recipe | Oxygen Index | $D'_{0.8}{}^{(a)}$ | $D_m{}^{(b)}$ | % Char$^{(c)}$ | % TC$^{(d)}$ |
|---|---|---|---|---|---|---|---|
| ZnTiO$_3$$^{(e)}$ | (½) | .18 | 66 | 145 | 381±45 | 13.2 | 30 |
| ZnWO$_4$ | (½) | .10 | 50 | 265 | — | 11.6 | 27 |
| | $^{(e)}$.41 | .55 | 185 | 322 | 17.5 | 40 | |

$^{(a)}$ - $D'_{0.8}$ is the smoke rating for the Smoke-OI test.
$^{(b)}$ - $D_m$ is the smoke rating for the NBS Smoke Chamber test. All numbers are based on an average of duplicate runs. Sample thickness was normalized to 50 mils.
$^{(c)}$ - % Char = $M_f - M_d/M_i \times 100$, where $M_i$ = initial wt., $M_f$ = final wt. Samples were exposed to a propane torch for 1.0 minute. Sample geometry was ¼" × ¾" ×0.075". Average of two runs.
$^{(d)}$ - % TC = % of theoretical char = % Char/A, where A is the maximum amount of char that can be formed and is defined by $$A = \frac{.44}{100 + X} + \frac{X}{100 + X}, \quad X = \text{per additive}.$$

(e) - pressed sheet after test was black. Sheet containing ZnWO$_4$ was amber.

In the case of the zinc tungstate there was a 51% average smoke reduction. In a pigmented plasticized formulation containing 34% of BdSO$_4$ pigment and 18% of dioctyl phthalate plasticizer with 2 parts of zinc tungstate, the average smoke % reduction was 31.

I claim:

1. A composition comprising a vinyl chloride polymer and zinc tungstate present in amounts from about 0.01 to about 10 weight parts per 100 weight parts of vinyl chloride polymer.

2. A composition of claim 1 wherein the vinyl chloride polymer is poly(vinyl chloride).

3. A composition of claim 1 wherein the vinyl chloride polymer contains up to about 50% by weight of at least one vinylidene compound copolymerized therewith having a terminal CH$_2$=C< group.

4. A composition of claim 2 wherein there is 0.75 to 3 parts of zinc tungstate.

* * * * *